June 5, 1956  W. E. MARTIN  2,749,141
TANDEM AXLE CONSTRUCTION
Filed Jan. 18, 1952  4 Sheets-Sheet 1
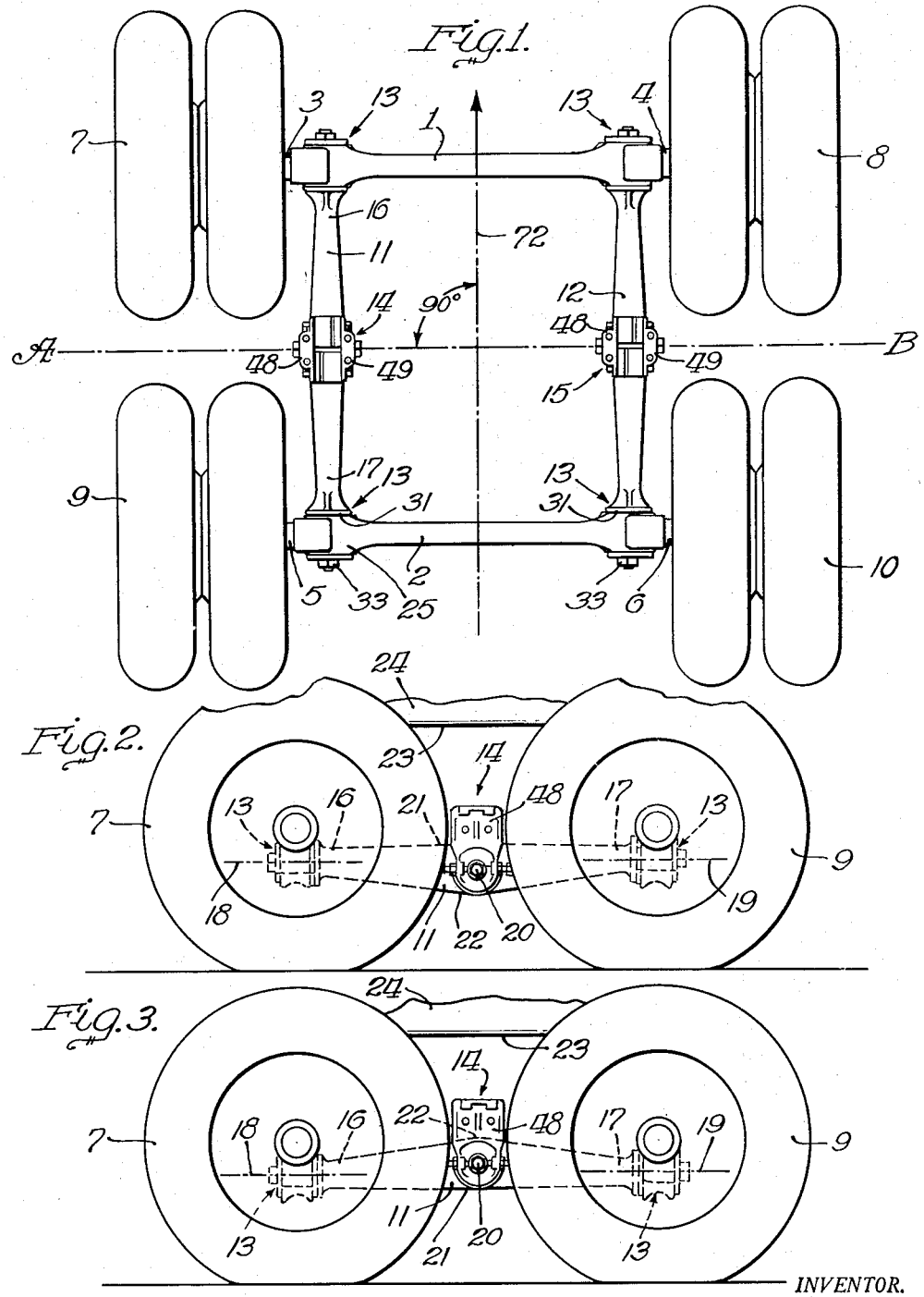
INVENTOR.
William E. Martin
BY
Eberhard E. Wettly
Atty.

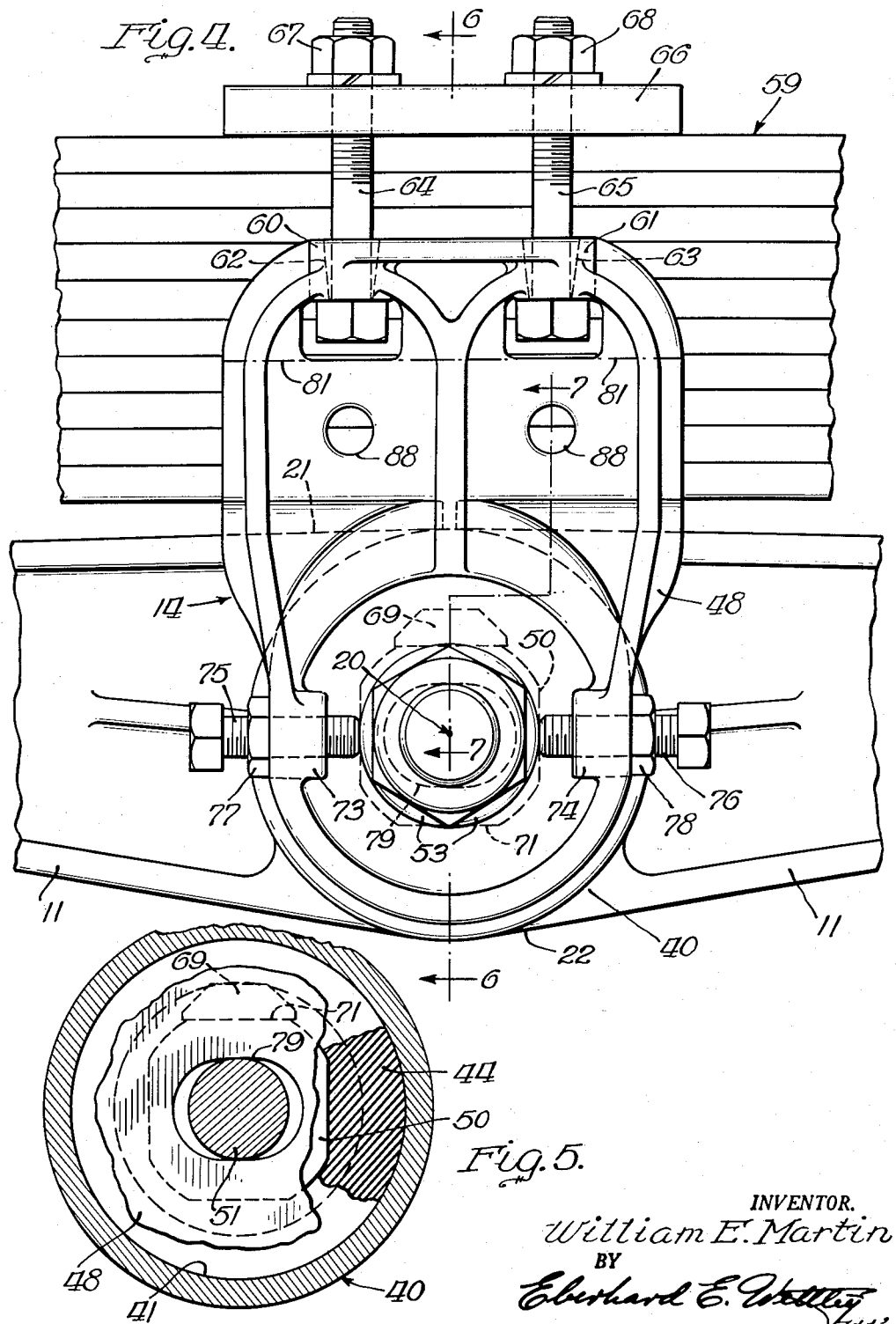

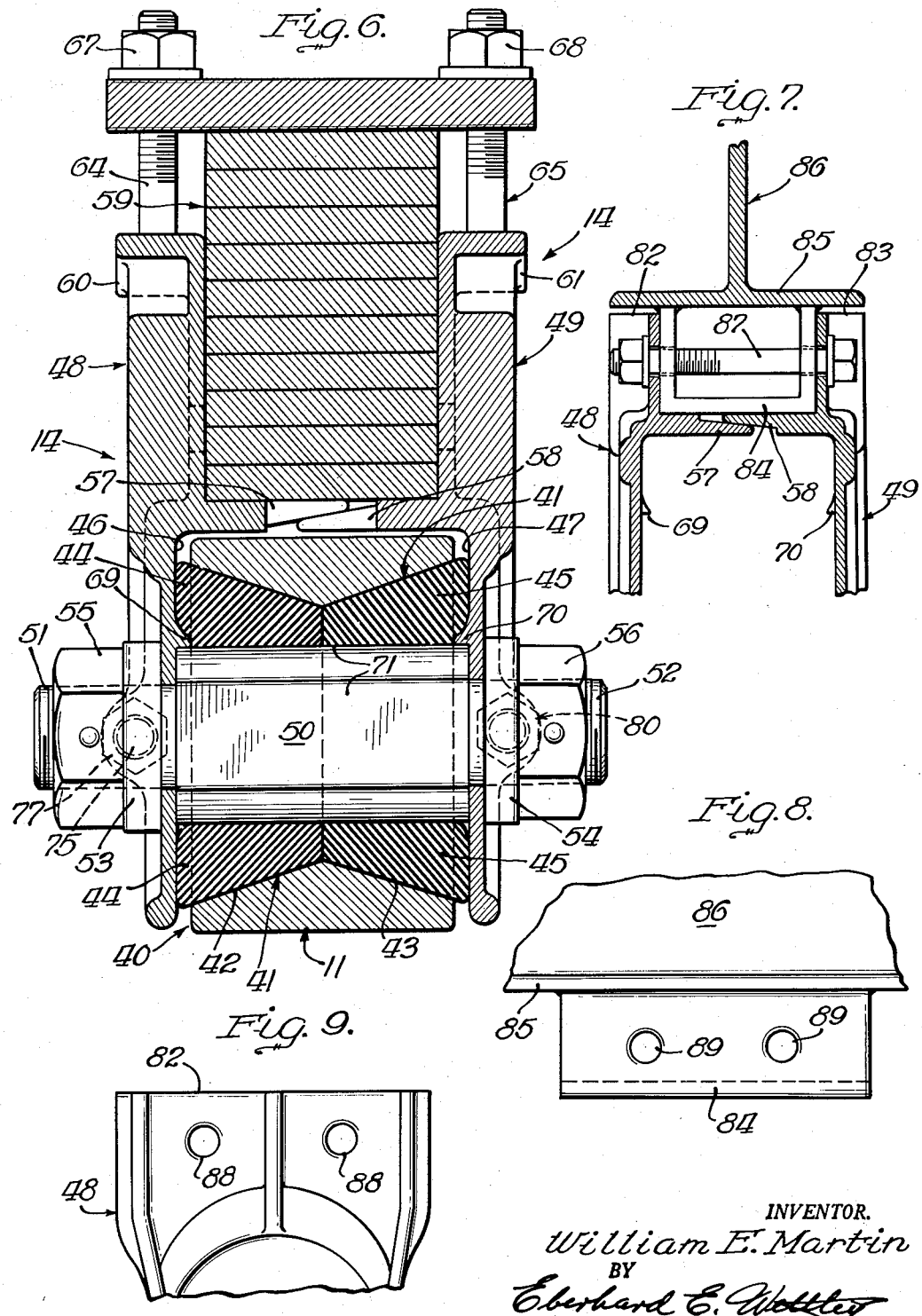

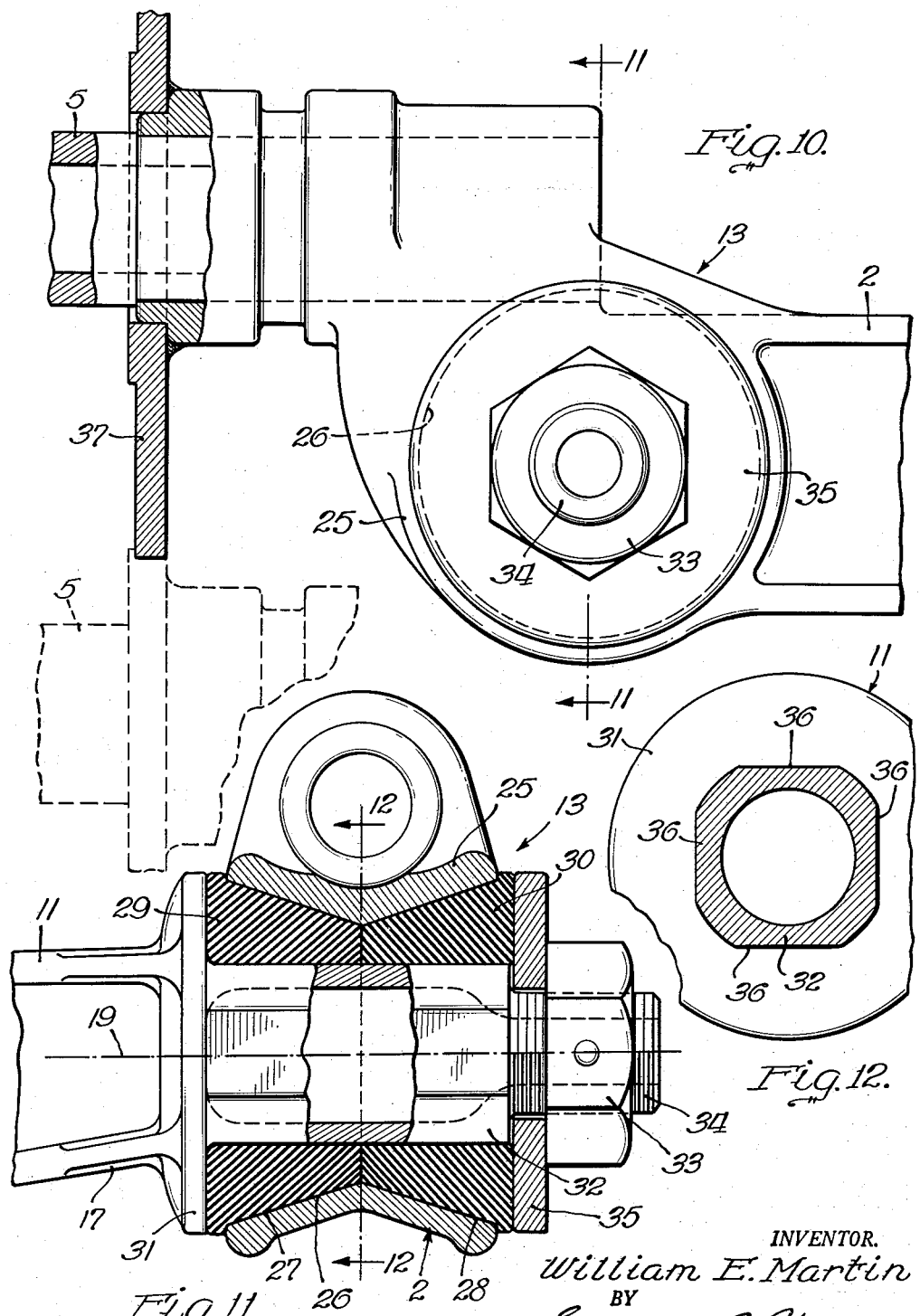

United States Patent Office 2,749,141
Patented June 5, 1956

2,749,141

TANDEM AXLE CONSTRUCTION

William E. Martin, Kewanee, Ill.

Application January 18, 1952, Serial No. 267,136

12 Claims. (Cl. 280—104.5)

This invention relates to the running gear of a vehicle and is more specifically directed to a tandem axle construction.

One of the objects of this invention is to provide a comparatively light weight axle structure for the framework of a wheeled carriage comprising a heavy duty load sustaining running gear for a vehicle.

Another object of the present invention is to provide a tandem axle construction utilizing interchangeable, reversible and invertible parts of simplified design to produce an easily assembled unit having variable possibilities to meet different requirements for different conditions of operation and/or use.

It is another object of the present invention to provide a tandem axle construction wherein the several parts are each designed for connection with adjacent parts through flexible joints or unions, each of the connecting portions of such adjacent parts including cooperative means to form the salient connecting elements of the resilient or flexible union interposed therebetween.

Another object of this invention is to provide such flexible joints or unions of the tandem axle structural parts that incorporate simplified fastening elements to easily assemble the main axle parts, and which elements are also usable interchangeably and at random to minimize assembly time and labor costs. These same cooperative fastening elements also simplify inspection and maintenance of the tandem axle structures not to overlook the ease of part replacements or repairs that might be required over periods of use under the heavy going to which such wheeled units are subjected.

Other objects and advantages relating to the tandem axle construction of the present invention shall hereinafter appear in the following detailed description having reference to the accompanying drawings forming a part of this specification.

In the drawings:

Fig. 1 is a more or less diagrammatic perspective view of the entire tandem axle construction built in conformance with the principles relating to the present invention, portions of this perspective being shown in exploded form to better illustrate certain details of construction thereof;

Fig. 2 is a longitudinal cross sectional view of one of the wheel spindles embodied in the tandem axle structure illustrated in Fig. 1;

Fig. 3 is an enlarged fragmentary side elevational view of the central portion of the walking beams of the tandem axle showing the bracket arrangement employed at this location for securing the axle to a vehicle part, Fig. 3 being substantially a view as seen along the line 3—3 in Fig. 1;

Fig. 4 is a side elevational view of a fragmentary portion of the walking beam and bracket assembly illustrated in Fig. 3 with certain portions thereof broken away and in section to illustrate further details of construction thereof;

Fig. 5 is a cross sectional view taken vertically through the walking beam and bracket assembly illustrated in Fig. 3 and substantially as viewed along the line 5—5 therein;

Fig. 6 is a cross sectional view taken vertically substantially along the line 6—6 in Fig. 3 showing the same bracket as applied to a different use in securing the tandem axle to a vehicle part;

Fig. 7 is a fragmentary side elevational view of the vehicle part which comprises a portion of the connection illustrated in Fig. 6;

Fig. 8 is a fragmentary detail side elevational view of the upper portion of the bracket as used in Fig. 6;

Fig. 9 is an enlarged side elevational view of one end of one of the axles incorporated in this tandem axle framework with a portion thereof broken away and in section to illustrate further details of construction thereof;

Fig. 10 is a cross sectional view taken vertically through the axle end as illustrated in Fig. 9 and substantially as seen along the line 10—10 therein; and Fig. 11 is a partial transverse cross sectional view of a portion of the walking beam structure substantially as viewed along the line 11—11 in Fig. 10.

The tandem axle framework forming the constructional backbone for a wheeled carriage of a vehicle, which axle structure comprises the present invention, may best be understood by reference to Fig. 1. As there illustrated, the running gear frame consists of a pair of axles 1 and 2 positioned and spaced in predetermined parallel alignment by means of a pair of walking beams 3 and 4 through suitable flexible joints or unions such as 5, 6, 7 and 8. Each of the axles includes aligned spindles 9—10 and 11—12, which are specifically designed to receive dual wheel assemblies thereon whereby the framework illustrated in Fig. 1 is designed for movement over the roadways and other surfaces by such running gear as dual wheels. In addition, each of the walking beams 3 and 4 includes a central bracket arrangement such as 13 and 14 which each comprise a flexible means for connecting the framework axle structure with a vehicle part. In general, this framework is an improvement over my prior Patent No. 2,456,719, issued December 21, 1948, and the uses of the present tandem axle structure are in general parallel to the uses of the tandem axle running gear shown and described in the aforementioned prior patent.

As seen in Fig. 1, the axles 1 and 2 are each symmetrically constructed to each side of the median plane traversing the length thereof. Furthermore, these axles are also interchangeable and may also be used end for end by reason of their symmetry. Furthermore, the walking beams 3 and 4 are also interchangeable in the sense that they can be used at either side of the framework illustrated, and these walking beams are each also symmetrical with respect to a vertical plane cross bisecting the central point of the lengths of each of the beams. The walking beams 3 and 4 also present a structure which may be inverted to provide a variable connecting structure supplemented by the bracket constructions 13 and 14 to change the relationships between the entire framework and the connected vehicle part or parts. The more specific details of this invertible arrangement and the construction of the walking beams per se, together with the cooperative bracket structures 13 and 14, are discussed and described in my copending application, Serial No. 267,137, filed of even date herewith.

Referring to Figs. 3, 4 and 5, the walking beam 3 is provided with a central aperture 15 having oppositely outwardly flared conical portions 16 and 17 to receive flexible bushings 18 and 19 that are sandwiched between interchangeable side brackets 20 and 21 and within the opening 15 of the walking beam 3. A bracket shaft 22 has a shoulder portion extending between the adjacent bracket walls 23 and 24 with reduced threaded studs 25 and 26 extending through openings in the brackets 20 and 21 to receive collars 27 and 28 together with the retaining nuts 29 and 30. The nuts 29 and 30 of the main assembly fastening members of this structure each acts to compress the flexible or resilient bushings 18 and 19 between the confines of the bracket walls and the peripheral interior of the opening 15 of the walking beam 3. The bushings together act as frictional holding members to maintain the bracket structure in predetermined relation with respect to the walking beam while such bushings through their own resiliency permit flexing between the bracket structures and their connected parts and the walking beam proper. Certain adjustments between the connected parts are permissible by the screw arrangements 31 and 32 as best shown in Fig. 3 and as further described in my copending application Serial No. 267,137.

The upper ends of the brackets 20 and 21 are provided with suitable apertured bosses 33—33 and 34—34 for the reception of bolts 35—35 and 36—36 which connect through apertures in a bearing plate 37 for the purpose of securing a vehicle spring 38 into the bracket structure and for connecting the tandem axle unit with a vehicle part such as the spring 38. Spring 38 seats upon cooperative ledge members 39 and 40 which form the bottom clamping members of the spring 38 coacting with plate 37 in this respect to hold the spring 38 within the bracket structure.

The foregoing connection with a spring such as 38, which is connected in conventional fashion to a vehicle, illustrates one means of connecting the tandem axle assembly with a vehicle. Figs. 6, 7 and 8 illustrate another manner in which the bracket structure previously described may be used in connecting the tandem axle with another vehicle part. As seen in Fig. 6, the brackets 20 and 21 have their upper portions cut off along a dot and dash line such as illustrated in Fig. 3 at 41, thus removing the upper boss portions 33—33 and 34—34. This provides flat stub ends 42 and 43 which cooperatively straddle a depending channel 44 that is welded or otherwise secured to the underface 45 of a vehicle I beam 46. The fastening is completed through the use of bolts 47, which in this case pass through aligned openings such as 48 illustrated in Figs. 3, 6 and 8 in the oppositely related bracket parts 20 and 21. The channel 44 is also provided with pairs of aligned openings 49 and 50 for receiving the fastening bolts 47 therethrough.

Referring to Figs. 9 to 11 inclusive, one of the axle ends and the union structure between such axle end and its adjacent walking beam portion may there best be seen. Since all the axle ends are identical, the same reference numerals will be applied to the like parts thereof. Each end of the axle 1 terminates with a circular or ring housing 51 as seen in Fig. 9, the housing having an opening 52 therethrough arranged about an axis 53 disposed transversely to the median axle 54 of the axle per se and intersecting the same. Thus, the invertion of either axle 1 or 2 will keep the ring housings 51 in the same longitudinal spaced relationships with respect to each other and obviously on the same longitudinal center line axis 54 of the axle.

Each ring housing 51 is further provided with an offset 55 carrying a spindle bearing sleeve 56 centered about an axis 57 disposed parallel to the axle axis 54 but vertically spaced therefrom. One of the wheel spindles such as 9 is secured by shrinking or press fit within the opening 58 of sleeve 56 to project outwardly beyond the ring housing 51 of the axle 1 for wheel connection. One or more webs 59 reinforce and strengthen the tie between the sleeve 56, ring housing 51 and axle 1, with the ring housing 51 and the attached or integral sleeve forming a cooperative right-angled cellular axle end of great strength and durability. Further web or webs 60 are also introduced to strengthen the offset cellular axle structure.

One or more annular ridges 61 and 61a encircle the free end 62 of sleeve 56 to counteract rupture and shearing of the sleeve 56 under reactional forces transmitted to the extended wheel spindle 9. The latter, as best seen in Figs. 2, 9 and 10, is fabricated with a hollow center 9a to reduce the weight thereof while still providing a stiff enough shell or body section 9b to sustain the load under an adequately allowable factor of safety.

The terminal part 63 of the free end 62 of the sleeve 56 is externally square in cross section to receive a flange disc or plate 64 thereon. Plate 64 has a corresponding square opening 65 and the plate and sleeve 56 are rigidly connected as by welding 66 or through other suitable means to hold the plate in a predetermined fixed relation to the axle structure. Plate 64 is normally employed for carrying the non-rotatable mechanism of a wheel assembly such as the brake structure and the hydraulic connections therefor.

As best seen in Fig. 10, the opening 52 in the ring housing 51 is conically flared oppositely outwardly as at 67 and 68 to constitute this portion of the ring housing as a cooperative part of one of the flexible joints or unions between an axle end and the adjacent end of one of the walking beams 3. Each walking beam end terminates with a longitudinal bearing shaft 69 disposed in axial alignment with the like shaft at the other end of the walking beam. Large area abutment flanges 70 are interposed between the walking beams at their ends and the bearing shafts 69 with each of the latter being arranged for central insertion through an axle ring housing 51 on an axis such as 53 shown in Figs. 9 and 10.

Each shaft 69 has a reduced diameter threaded stud 71 to receive a bushing retainer or washer 72 of a size and shape as the abutment flange 70 on the beam. Conically formed bushings 73 and 74, of resilient material, are carried upon the shaft 69 and extend outwardly from the sides of the ring housing 51 for compression between abutment 70 and the retainer or washer 72 as may be instituted by the fastening nut 73' when drawn up to a predetermined amount to rigidly connect all the several parts of this flexible joint or union into the relative cooperative positions best illustrated in Fig. 10.

The bushings 73 and 74 frictionally keep the parts together in their designed relationships, and the surface contour of the bearing shaft 69 counteracts axial rotation of the walking beam about an axis lengthwise of the beam and coincident with the two bearing shafts of the beam. Thus, the surface of shaft 69 is flattened as at 75 in Fig. 11 to attain this non-rotational feature.

Shaft 69 is also made of tubular construction being cored out at 76 to reduce weight and to still possess the necessary strength in a joint of this kind. Both the open ends of shafts 69 or of the spindles 9 may be suitably plugged to prevent entry of moisture or foreign materials when in use.

The bushings 18 and 19 are identical with each other and with bushings 73 and 74, while the bracket shafts 22 have the same cross-sectional shapes and contours as the bearing shafts 69 of the axle corner connections. The walking beams 3 and 4 are invertible and can be used end for end and are bodily interchangeable. The axles are usable end for end and are also bodily interchangeable and may, if desired, be inverted from a raised spindle position as shown in full lines in Fig. 9 to a lowered dotted line spindle position coincident with an axis 57a. Various underslung arrangements are thus possible and various tandem axle clearance arrangements with respect to a vehicle body or part are also possible. Wheel sizes may be varied and clearances provided to suit such variations and changes.

As a further weight saving factor, both of the walking beams and the axles are of I-beam cross sections. The axles generally maintain a uniform I-beam section size throughout their lengths. The walking beam bodies taper from a larger central size to narrower terminal ends at the axles, thereby reducing weight while providing means to accommodate the bracket connections and to establish central openings to receive resilient bushings of the same sizes and shapes as the resilient bushings at the corner joints of the axle framework of the wheeled unit.

Changes in the exact arrangement and combination of elements are contemplated without departure from the fundamental concept of the present invention. Such modifications shall, however, be governed by the limitations presented by the breadth and scope of the language in the following claims.

What I claim is:

1. A tandem axle framework comprising a pair of axles, walking beams connected with said axles at points disposed in a common plane, said axles having wheel spindles disposed in predetermined positions with respect to said common plane, said walking beams each being bodily offset in a vertical direction with respect to said common plane and intermediate their lengths, and said beams being bodily invertible about their axle connections to dispose the offset beam portions in another elevational offset position with respect to said common plane and in respect to the positions of said spindles.

2. A tandem axle framework comprising a pair of axles, walking beams connected with said axles at points disposed in a common plane, said axles having wheel spindles at their ends connected in vertical offset relations with respect to said common plane, said walking beams each being bodily offset in a vertical direction with respect to said common plane and intermediate their lengths, and said beams being bodily invertible about their axle connections to dispose the offset beam portions in another elevational offset position with respect to said common plane and in respect to the positions of said spindles, and said axles each being bodily invertible with respect to the walking beams at their respective points of connection to dispose said offset spindles of each axle in a different vertical relation with respect to the axle framework.

3. A tandem axle framework comprising a pair of axles, walking beams connected with said axles at points disposed in a common plane, said axles having wheel spindles disposed in predetermined positions with respect to said common plane, said walking beams each being bodily offset in a vertical direction with respect to said common plane and intermediate their lengths, and said beams being bodily invertible about their axle connections to dispose the offset beam portions in another elevational offset position with respect to said common plane and in respect to the positions of said spindles, and bracket units fixedly connected with said walking beams at their offset portions and having fastening parts for connection with a vehicle part, said brackets being arranged for inversion relatively to their beams upon inversion of said beams.

4. A framework for a tandem axle including a pair of axles, ring housings at the ends of each axle disposed upon the longitudinal center line of said axle, hollow wheel spindle sleeves carried generally tangentially upon each of said ring housings and in offset relation with respect to the axle center lines, beams to connect said axles at said ring housings, and releasible fastening units interposed between said ring housings and the adjacent ends of the beams to connect the axles with the beams, said axles each being bodily invertible at their connections with said beams through said releasible fastening units whereby said spindle sleeves may be positioned at different elevations with respect to the general plane of the framework of said axle and in relation to the axle connecting beams.

5. A framework for a tandem axle including a pair of axles, ring housings at the ends of each axle disposed upon the longitudinal center line of said axle, hollow wheel spindle sleeves carried generally tangentially upon each of said ring housings and in offset relation with respect to the axle center lines, beams to connect said axles at said ring housings, and releasible fastening units interposed between said ring housings and the adjacent ends of the beams to connect the axles with the beams, said axles each being bodily invertible at their connections with said beams through said releasible fastening units whereby said spindle sleeves may be positioned at different elevations with respect to the general plane of the framework of said axle and in relation to the axle connecting beams, said beams each having vertically offset portions intermediate their lengths for connection with a vehicle, and said beams each being bodily invertible with respect to said axles at said releasible fastening units to displace the offset portions of the beams at a different vehicle attachment elevation and with respect to the general horizontal plane of the framework of the axle.

6. A framework for a tandem axle including a pair of axles, ring housings at the ends of each axle disposed upon the longitudinal center line of said axle, hollow wheel spindle sleeves carried generally tangentially upon each of said ring housings and in offset relation with respect to the axle center lines, beams to connect said axles at said ring housings, and releasible fastening units interposed between said ring housings and the adjacent ends of the beams to connect the axles with the beams, said axles each being bodily invertible at their connections with said beams through said releasible fastening units whereby said spindle sleeves may be positioned at different elevations with respect to the general plane of the framework of said axle and in relation to the axle connecting beams, said beams each having vertically offset portions intermediate their lengths for connection with a vehicle, and said beams each being bodily invertible with respect to said axles at said releasible fastening units to displace the offset portions of the beams at a different vehicle attachment elevation and with respect to the general horizontal plane of the framework of the axle, and a bracket unit connectible with each of said offset portions of said beams and having fastening parts for connection with a vehicle, said bracket units each being bodily invertible with respect to their associated beams.

7. A tandem axle framework comprising a pair of axles, walking beams connected with said axles at points disposed in a common plane, said axles having wheel spindles disposed in predetermined positions with respect to said common plane, said walking beams each being bodily offset in a vertical direction with respect to said common plane and intermediate their lengths, and said beams being bodily invertible about their axle connections to dispose the offset beam portions in another elevational offset position with respect to said common plane and in respect to the positions of said spindles, said axles being constructed symmetrically end for end about a central transverse plane whereby said axles are bodily interchangeable and usable in end to end relation at either axle location, and said walking beams each comprising an end to end symmetrical structure taken in relation to a central transverse plane whereby said beams are bodily interchangeable and usable in end to end relation at either beam location of the axle framework.

8. A tandem axle framework comprising, in combination, a pair of axles, a pair of walking beams, said axles each comprising an I-beam terminating with hollow ring housings at the opposite ends thereof, hollow sleeves carried generally tangentially of said housings and in offset relation with respect to the axle, and hollow wheel spindles secured in said sleeves and extending outwardly therefrom and away from said ring housings for connection with the wheels, and said walking beams each comprising an I-beam having narrow ends and an enlarged mid-portion with a central aperture for the reception of vehicle connecting brackets, said walking beam ends including hollow stub members for disposition within said ring housings of the axle, and fastening units each adapted for cooperatively joining said stub members and ring housings, respectively, to connect the adjacent axle and walking beam parts.

9. A tandem axle framework comprising, in combination, a pair of axles, a pair of walking beams, said axles each comprising an I-beam terminating with hollow ring housings at the opposite ends thereof, hollow sleeves carried generally tangentially of said housings and in offset relation with respect to the axle, and hollow wheel spindles secured in said sleeves and extending outwardly therefrom and away from said ring housings for connection with the wheels, and said walking beams each comprising an I-beam having narrow ends and an enlarged mid-portion with a central aperture for the reception of vehicle connecting brackets, said walking beam ends including hollow stub members for disposition within said ring housings of the axle, and resilient fastening units each adapted for connecting the hollow stub members with the ring housings, respectively, to connect the adjacent axle and walking beam parts, said fastening units each comprising resilient bushings formed to fit the internal contour of a ring housing, said bushings having apertures to fit a hollow stub member, said bushings extending outwardly of the sides of the ring housing, said adjacent walking beam end having an abutment disc to engage the bushings at one side, a washer at the other side of the bushings, and screw means to draw said abutment and washer together to compress the resilient bushings and to expand the same in said ring housing to firmly join the adjacently disposed parts and to provide a flexible connection between the axle and walking beam.

10. A tandem axle framework comprising at least one pair of axle members, walking beam members for said axle members, fastening units to connect said respective members together at points all disposed in a common plane and in the plane of said members, wheel spindles carried upon certain of said members and arranged in a given relation with respect to said common plane for the reception of the wheels, and certain of said members being bodily offset intermediate their ends and in relation to said common plane location of said fastening units, and any one of said axle members and said walking beam members being bodily invertible with respect to the others to selectively change the positions of certain of said wheel spindles with respect to the plane common to the points of location of said fastening units and said connected members.

11. A tandem axle framework of the character set forth in claim 10, but wherein bracket assemblies are fastened to and connected with said offset portions of said certain of said members and adapted for rigid connection with a vehicle structure to thereby mount said latter members in a given relation with respect to said vehicle structure.

12. A tandem axle framework of the character set forth in claim 11, but wherein said fastening units include resilient means to permit limited relative flexing between the connected members, and wherein said bracket assemblies include resilient means to allow limited relative flexing between such brackets and the associated connected members.

References Cited in the file of this patent
UNITED STATES PATENTS

| | | |
|---|---|---|
| 1,243,401 | Griswold | Oct. 16, 1917 |
| 1,739,450 | Fageol | Dec. 10, 1929 |
| 1,946,624 | Irish | Feb. 13, 1934 |
| 2,445,686 | Nabors | July 20, 1948 |
| 2,488,002 | Carraher | Nov. 15, 1949 |
| 2,510,172 | Double et al. | June 6, 1950 |
| 2,523,954 | Jungwirth | Sept. 26, 1950 |
| 2,547,993 | Benz | Apr. 10, 1951 |